United States Patent
Berryman et al.

(10) Patent No.: US 9,148,010 B2
(45) Date of Patent: Sep. 29, 2015

(54) RESIDUAL CURRENT DEVICE (RCD) WITH EARTH CURRENT SENSING

(71) Applicant: HYBRID ELECTRONICS AUSTRALIA PTY. LTD., Bayswater, Victoria (AU)

(72) Inventors: Walter Henry Berryman, Inverloch (AU); David Jankowski, Brinsmead (AU)

(73) Assignee: HYBRID ELECTRONICS AUSTRALIA PTY LTD, Victoria (AU)

( * ) Notice: Subject to any disclaimer, the term of this patent is extended or adjusted under 35 U.S.C. 154(b) by 117 days.

(21) Appl. No.: 14/041,749

(22) Filed: Sep. 30, 2013

(65) Prior Publication Data

US 2014/0092502 A1 Apr. 3, 2014

(30) Foreign Application Priority Data

Oct. 1, 2012 (AU) ................... 2012904268

(51) Int. Cl.
*H02H 3/00* (2006.01)
*H02H 9/08* (2006.01)
*H02H 3/16* (2006.01)
*H02H 3/33* (2006.01)

(52) U.S. Cl.
CPC .. *H02H 3/16* (2013.01); *H02H 3/33* (2013.01)

(58) Field of Classification Search
CPC ......... H02H 3/16; H02H 3/162; H02H 3/165; H02H 3/167; H02H 3/26; H02H 3/32; H02H 3/33; H02H 3/331; H02H 5/105

USPC .................................................. 361/42–50
See application file for complete search history.

(56) References Cited

U.S. PATENT DOCUMENTS

| | | | | |
|---|---|---|---|---|
| 3,848,159 A | * | 11/1974 | Nye et al. | 361/45 |
| 3,930,187 A | * | 12/1975 | Misencik | 361/45 |
| 3,953,767 A | * | 4/1976 | Ahmed | 361/44 |
| 3,959,693 A | * | 5/1976 | Coley et al. | 361/45 |
| 5,917,687 A | * | 6/1999 | Fleckenstein | 361/45 |
| 2003/0058596 A1 | * | 3/2003 | MacBeth | 361/93.5 |
| 2004/0156155 A1 | * | 8/2004 | Ward | 361/42 |
| 2009/0121887 A1 | * | 5/2009 | Fong | 340/650 |
| 2010/0052691 A1 | * | 3/2010 | Fong | 324/424 |
| 2010/0309592 A1 | * | 12/2010 | Kinsel | 361/50 |

* cited by examiner

*Primary Examiner* — Thienvu Tran
*Assistant Examiner* — Christopher Clark
(74) *Attorney, Agent, or Firm* — Birch, Stewart, Kolasch & Birch, LLP (57) ABSTRACT

Safety apparatus is disclosed for use with a load circuit connectable to a power supply via an Active conductor and a Neutral return conductor and including an Earth return conductor. The apparatus comprises means for detecting a difference in load current flowing between an energized Active conductor and the Neutral return conductor; and means for disconnecting the load circuit from the power supply in response to the difference in load current, wherein the means for detecting includes means for sensing a leakage current flowing between the Earth return conductor and the Neutral return conductor. A method of operating a load circuit connectable to a power supply via an active conductor and a neutral return conductor is also disclosed.

21 Claims, 6 Drawing Sheets

RESIDUAL CURRENT DEVICE (RCD) WITH EARTH CURRENT SENSING

FIELD OF THE INVENTION

The present invention relates to safety devices known as residual current devices (RCDs) or residual current circuit breakers (RCCBs).

BACKGROUND OF THE INVENTION

An RCD or RCCB is a device that disconnects an associated load circuit whenever it detects that an electric current is leaking out of the circuit, such as current leaking to Earth through a ground fault. Such devices are intended to operate quickly so that when a person contacts a live conductor, the circuit is isolated before electric shock can drive the heart into ventricular fibrillation, which may cause death in such circumstances. Most RCD/RCCB devices are designed to trip when a leakage current that exceeds a threshold such as 30 mA (milliamps) is detected.

A significant problem with existing RCD/RCCB devices is a requirement that a good Earth to Neutral connection should be present for reliable and accurate operation of such devices. This means that great care and cost may be required to establish a "good" Earth connection. For example large building sites using electrically isolated power generators may require one winding of the generator to be connected to Earth and equipped with one or more RCDs. It also means that RCDs may have limited effectiveness in some parts of the world including those parts having sandy soils, such as the Middle East where it may be difficult to establish a good Earth connection.

The present invention may provide an improved safety device that may maintain protection against risk of electric shock in the event that the Earth to Neutral connection becomes excessively poor due to high resistance or discontinuity, or through a fault or other reason may cease to exist altogether, eg. when using an isolated power supply such as a generator. In such circumstances a safety device according to the present invention may provide a significant defense against risk of electric shock including in those parts of the world where it may be difficult to establish a good Earth connection.

SUMMARY OF THE INVENTION

According to one aspect of the present invention there is provided a safety apparatus for use with a load circuit connectable to a power supply via an Active conductor and a Neutral return conductor and including an Earth return conductor, said apparatus comprising:
means for detecting a difference in load current flowing between an energized said Active conductor and said Neutral return conductor;
means for disconnecting said load circuit from said power supply in response to said difference in load current;
wherein said means for detecting includes means for sensing a leakage current flowing between said Earth return conductor and said Neutral return conductor.

The means for detecting a difference in load current may include a differential current transformer such as a toroid transformer. The differential current transformer may include a detecting winding responsive to the difference in load current between the Active conductor and the Neutral return conductor. The differential current transformer may include a sensing winding for receiving at least some of the leakage current flowing between the Earth return conductor and the Neutral return conductor.

The sensing winding may be arranged such that at least some of the leakage current flowing between the Earth return conductor and the Neutral return conductor acts to reinforce any difference in the load current flowing between the Active and Neutral return conductors. The sensing winding may be wound such that the phase of the leakage current is the same as the difference in (Active to Neutral) load current so that their amplitudes are additive. The sensing winding may be wound with plural turns to provide additional sensitivity. The apparatus may include means to adjust the number of turns on the sensing winding in response to a measure of Earth to Neutral resistance.

The safety apparatus may include an RCD or RCCB device. The means for sensing the leakage current may include a resistor and/or a current limiting circuit. The means for disconnecting may be adapted to disconnect the load circuit from the power supply without a significant difference in load current being detected.

In some embodiments the power supply may include a three-phase power supply with a common Earth connection, each phase having an Active conductor and a Neutral return conductor, and each phase having means for detecting a difference in load current flowing between respective Active and Neutral return conductors. The apparatus may include separate means for disconnecting each respective load circuit from the three-phase power supply in response to respective differences in load current. The apparatus may be arranged such that the phase that is disconnected is the phase with highest difference in load current and significant Earth to Neutral current in the same phase.

The load circuit may include a common bond electrical environment and the apparatus may include a communications system to help decide the phase that is disconnected. The apparatus may be arranged such that the phase that is disconnected is decided by assessing and matching highest difference in load current of one means for detecting a difference in load current with highest Earth to Neutral current in the same phase of a separate means for detecting a difference in load current.

According to another aspect of the present invention there is provided a method of operating a load circuit connectable to a power supply via an Active conductor and a Neutral return conductor and including an Earth return conductor, said method comprising:
detecting a difference in load current flowing between an energized said Active conductor and said Neutral return conductor;
disconnecting said load circuit from said power supply in response to said difference in load current;
wherein said step of detecting includes sensing a leakage current flowing between said Earth return conductor and said Neutral return conductor.

DETAILED DESCRIPTION OF THE INVENTION

A conventional safety device such as an RCD operates by passing switched load Active and Neutral lines through a differential current transformer such as a toroid transformer. There typically is enough output voltage from the toroid transformer to reliably measure current difference between the Active and Neutral leads passing through the transformer. This current difference is usually due to current "leakage" lost to "Earth" at a chassis in the load circuit or to other Earth connected metal structures. The current leakage may be due to an electrical fault or to electric shock if a person is touching an Active or "live" conductor and also an "Earthed" structure such as a stove frame or kitchen sink. Ten milliamps of electric shock is typically a maximum amount of current that a small adult can accept and still "let go" of a live conductor that they are holding. Thirty milliamps is typically a maximum amount of current that a human heart can withstand without being driven into ventricular fibrillation.

Figure 1:
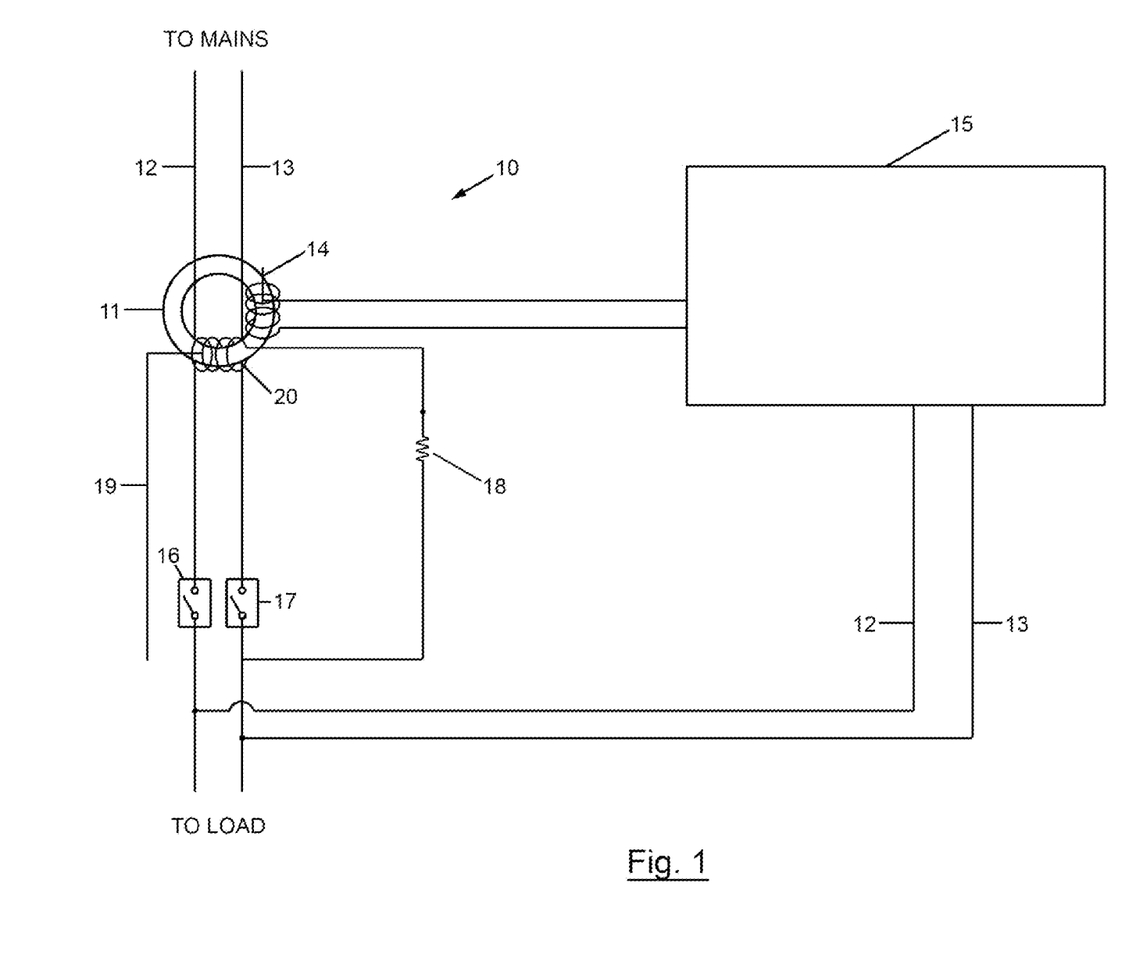
FIG. 1 shows an Earth current sensing RCD according to one embodiment of the present invention.

Referring to FIG. 1, an RCD 10 according to one embodiment of the present invention includes toroid transformer 11 with respective 'windings' for passing load current associated with load Active and load Neutral conductors 12,13 respectively. When the load current passing to and from the load (not shown) is the same, ie. the current in toroid transformer 11 is balanced, a null net magnetic field is induced in toroid transformer 11. This is because the "to and from" currents flow in opposite directions and their effect on the magnetic field induced in toroid transformer 11 is substantially cancelled.

When the load current passing to and from the load is not the same, ie. the current in conductors 12,13 associated with toroid transformer 11 is not balanced, a net magnetic field is induced in toroid transformer 11 and is detected as a small voltage in winding 14 of toroid transformer 11.

RCD 10 includes a control circuit 15 having electronics for switching circuit breakers 16, 17 associated with Active and Neutral conductors 12, 13 in the event that control circuit 15 detects via winding 14, a difference between the load current passing through the load Active and load Neutral conductors 12,13. The voltage detected in winding 14 of toroid transformer 11 may be a few millivolts and is amplified via electronics in control circuit 15 and used to level trigger a solenoid drive to switch circuit breakers 16, 17.

RCD 10 includes resistor 18 connected from load loop Neutral conductor 13 to Earth loop conductor 19 via winding 20 associated with toroid transformer 11. Winding 20 may include a single loop or multiple extra loops (1 to 5 turns) for improved sensitivity. Providing that winding 20 is wound in a correct sense or direction relative to winding 14, the Earth current sensed via winding 20 will be additive to the measured differential (or "leakage") current between load Active and load Neutral conductors 12, 13.

When a "good" Earth or good connection of loop Earth to Neutral exists there may be substantially zero current flowing in resistor 18 between load loop Neutral conductor 13 and Earth loop conductor 19. When there is a "poor" connection of loop Earth to Neutral denoting a significant resistance to Neutral, any leakage of current to Earth loop will raise the Earth Loop voltage and reduce the leakage sensed by toroid transformer 11. This raised Earth voltage will be sensed as a current in winding 20 on toroid transformer 11 and its effect will be added to the differential current sensed via winding 14 on toroid transformer 11.

Tables 1A to 1C below show that in the embodiment of FIG. 1 a rising Earth voltage reduces sensitivity of RCD 10 and that this may be corrected and/or over-corrected by including additional Earth current sensing turns on winding 20 of toroid transformer 11.

TABLE 1A

Single Turn Earth Winding on the Toroid

| Earth-Neut Res kOhm | Hybrid Res kOhm | R # k Ohm | R total k Ohm | Earth Volts | Act-Earth k Ohm | RCD mA | Earth Current mA | Sensed Current mA |
|---|---|---|---|---|---|---|---|---|
| 0 | 8 | 0 | 8 | 0 | 8 | 30 | 0 | 30 |
| 1 | 8 | 0.888889 | 8.888889 | 24 | 8 | 27 | 3 | 30 |
| 5 | 8 | 3.076923 | 11.07692 | 66.66667 | 8 | 21.666667 | 8.3333333 | 30 |
| 10 | 8 | 4.44444 | 12.44444 | 85.71429 | 8 | 19.285714 | 10.714286 | 30 |
| 20 | 8 | 5.714286 | 13.71429 | 100 | 8 | 17.5 | 12.5 | 30 |
| 50 | 8 | 6.896552 | 14.89655 | 111.1111 | 8 | 16.111111 | 13.888889 | 30 |
| 100 | 8 | 7.407407 | 15.40741 | 115.3846 | 8 | 15.576923 | 14.423077 | 30 |
| 1000 | 8 | 7.936508 | 15.93651 | 119.5219 | 8 | 15.059761 | 14.940239 | 30 |
| | | | | | | Potential Shock Current mA | | Sum RCD + Earth Current = 30 mA |

TABLE 1B

2 Turn Earth Winding on the Toroid

| 240 V Supply Earth-Neut Res kOhm | Hybrid Res kOhm | R # k Ohm | R total k Ohm | Earth Volt Volts | Trigger Leakage k Ohm | RCD mA | Earth Current mA | Sensed Current mA | |
|---|---|---|---|---|---|---|---|---|---|
| 0 | 8 | 0 | 8 | 0 | 8 | 30 | 0 | 30 | Trigger |
| 1 | 8 | 0.888889 | 8.888889 | 24 | 8 | 27 | 3 | 33 | Trigger |
| 5 | 8 | 3.076923 | 11.07692 | 66.66667 | 8 | 21.666667 | 8.3333333 | 38.333333 | Trigger |
| 10 | 8 | 4.444444 | 12.44444 | 85.71429 | 8 | 19.285714 | 10.714286 | 40.714286 | Trigger |
| 20 | 8 | 5.714286 | 13.71429 | 100 | 8 | 17.5 | 12.5 | 42.6 | Trigger |
| 50 | 8 | 6.896662 | 14.89655 | 111.1111 | 8 | 16.111111 | 13.888889 | 43.888889 | Trigger |
| 100 | 8 | 7.407407 | 15.40741 | 115.3846 | 8 | 15.576923 | 14.423077 | 44.423077 | Trigger |

TABLE 1B-continued

2 Turn Earth Winding on the Toroid

| 240 V Supply Earth-Neut Res kOhm | Hybrid Res kOhm | R # k Ohm | R total k Ohm | Earth Volt Volts | Trigger Leakage k Ohm | RCD mA | Earth Current mA | Sensed Current mA | |
|---|---|---|---|---|---|---|---|---|---|
| 1000 | 8 | 7.936508 | 15.93651 | 119.5219 Same as 1 Turn | 8 | 15.059761 Potential Shock Current mA | 14.940239 | 44.940239 Higher sensitivity to Earth current | Trigger |

TABLE 1C

5 Turn Earth Winding on the Toroid

| 240 V Supply Earth-Neut Res kOhm | Hybrid Res kOhm | R # k Ohm | R total k Ohm | Earth Volt Volts | Trigger Leakage k Ohm | RCD mA | Earth Current mA | Sensed Current mA | |
|---|---|---|---|---|---|---|---|---|---|
| 0 | 8 | 0 | 8 | 0 | 8 | 30 | 0 | 30 | Trigger |
| 1 | 8 | 0.888889 | 8.888889 | 24 | 8 | 27 | 3 | 42 | Trigger |
| 5 | 8 | 3.076923 | 11.07692 | 66.66667 | 8 | 21.666667 | 8.3333333 | 63.333333 | Trigger |
| 10 | 8 | 4.444444 | 12.44444 | 85.71429 | 8 | 19.285714 | 10.714286 | 72.857143 | Trigger |
| 20 | 8 | 5.714286 | 13.71429 | 100 | 8 | 17.5 | 12.5 | 80 | Trigger |
| 50 | 8 | 6.896552 | 14.89655 | 111.1111 | 8 | 16.111111 | 13.888889 | 85.555556 | Trigger |
| 100 | 8 | 7.407407 | 15.40741 | 115.3846 | 8 | 15.576923 | 14.423077 | 87.692306 | Trigger |
| 1000 | 8 | 7.936508 | 15.93651 | 119.5219 Same as 1 Turn | 8 | 15.059761 Potential Shock Current mA | 14.940239 | 89.760956 Much Higher Sensitivity to Earth Current | Trigger |

Table 1A provides calculations for parallel resistance (in K ohms), total resistance (in K ohms), Earth voltage (in volts), Active-Earth resistance (in K ohms), RCD current (in mA), Earth current (in mA) and sensed current (in mA), and shows the effect of changing the Earth to Neutral Resistance from zero to 1000 K ohms when there is a constant leakage resistance of 8K ohms and a power supply of 240 Volts AC.

Note that a rising loop Earth voltage with higher Earth loop to Neutral resistance is a secondary hazard for people touching a frame of an item such as a toaster, washing machine or sink that may have a lower Earth to Neutral resistance.

Note also that the 8K ohm load Active to Earth resistance could be a person suffering an Electric Shock due to touching a Load Active conductor and an Earthed frame or chassis. In that case the RCD mA current column represents the "shock" Current that the person would experience, ranging from 30 mA for a low Earth to Neutral frame resistance to 15 mA for an extremely high Earth to Neutral frame resistance.

Tables 1B and 1C show the effects of using 2 and 5 turns respectively for sensing winding 20 which in effect over corrects the "lost leakage" due to higher Earth voltage. One reason for over-correction is that a rising Earth voltage on a chassis due to leakage may create a significant safety hazard when it exceeds 50 volts. This is due to the possibility of a person connecting with the high voltage chassis and also connecting to ground perhaps through a water tap. A Ground Loop completely isolated from Neutral, with a small leakage could provide up to 240 Volts on the chassis.

Other reasons for providing plural Earth current loop turns for additional Earth current sensitivity may include the possibility that a rise in Earth current may be due to Active loop leakage (or electric shock) associated with a separate load circuit passing through the loop Earth and raising the Earth voltage. The plural turns associated with the Earth conductor also highlight electrical issues associated with Earth loop or Earth stake wiring in normally low Resistance Earth-Neutral environments.

An additional safety margin may be provided by limiting available current from the Neutral to the Earth Loop to say 5-10 mA. A current limiting strategy may be adopted in addition to using plural turns for sensing winding 20. Current limiting may have little effect for relatively lower resistance values between Neutral and Earth but may provide a significant safety benefit if a loop Earth has completely lost connection to Neutral such as at the meter box, at a supply pole or at a remote transformer substation.

Figure 2:
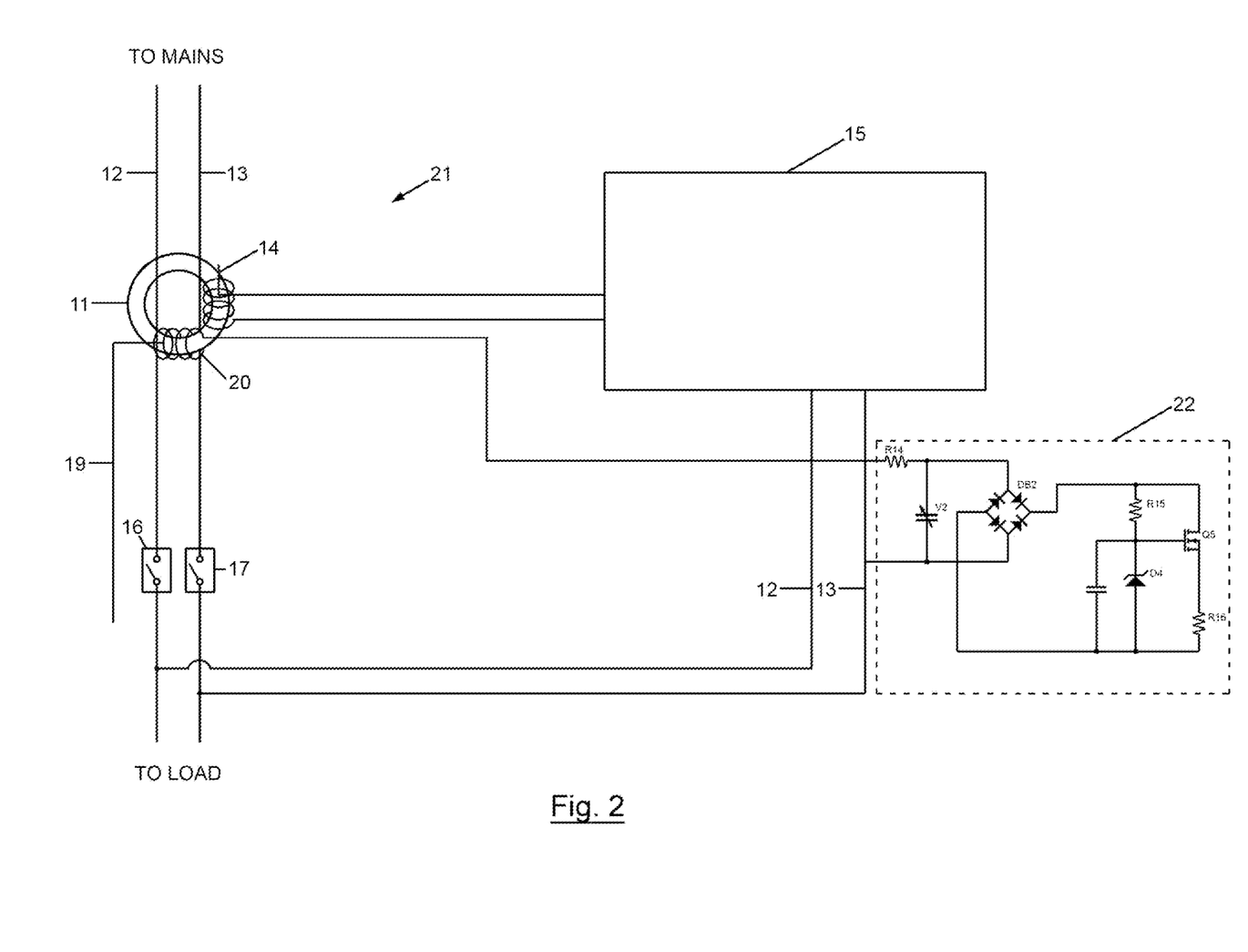
FIG. 2 shows an Earth current sensing RCD according to another embodiment of the present invention.

One form of current limiting circuit for higher Earth to Neutral Resistance values is shown in FIG. 2. FIG. 2 shows an RCD 21 and includes elements and components 11 to 17 and 19 to 21 that are comparable to like numbered elements and components shown in the embodiment of FIG. 1. However, leakage sensing resistor 18 in FIG. 1 is replaced with current limiting circuit 22 in FIG. 2. Current limiting circuit 22 includes MOSFET transistor Q5 biased via zener diode D4 and is adapted to limit current passing through transistor Q5 to approximately 10 mA. Current limiting circuit 22 includes full wave rectifier DB2 to interface transistor Q5 to AC current flowing in Active and Neutral conductors 12, 13.

Tables 2A to 2D below are similar to Tables 1A to 1C and show the effect of limiting current in the Earth to Neutral sensing circuit of FIG. 2 to a "let go" level of 10 mA.

TABLE 2A

Single loop of Toroid with Earth Wire

| 240 V supply Earth-Neut Res kOhm | Hybrid Res kOhm | R # k Ohm | R total k Ohm | Earth Volt Volts | Act-Earth Leakage k Ohm | RCD Current mA | Earth-Neut Current mA | Sensed Current | |
|---|---|---|---|---|---|---|---|---|---|
| 0 | 8 | 0 | 8 | 0 | 8 | 30 | 0 | 30 | Trigger |
| 1 | 8 | 0.888889 | 8.888889 | 24 | 8 | 27 | 3 | 30 | Trigger |
| 5 | 8 | 3.076923 | 11.07692 | 66.66567 | 8 | 21.686667 | 8.3333333 | 30 | Trigger |
| 10 | 8 | 4.444444 | 12.44444 | 85.71429 | 8 | 19.285714 | 10.714286 | 30 | Trigger |
| 20 | 8 | 5.714286 | 13.71429 | 100 | 8 | 17.5 | 12.5 | 30 | Trigger |
| 50 | 8 | 6.896552 | 14.89655 | 111.1111 | 8 | 16.111111 | 13.888889 | 30 | Trigger |
| 100 | 8 | 7.407497 | 15.40741 | 115.3846 | 8 | 15.576923 | 14.423077 | 30 | Trigger |
| 1000 | 8 | 7.936588 | 15.93651 | 119.5219 High | 8 | 15.059761 Potential Shock Current mA | 14.940239 No Current Limiting | 30 | Trigger |

TABLE 2B

Single Loop of Toroid with Earth Wire and Earth Current Limiting

| 240 V supply Earth-Neut Res kOhm | Variable Hybrid Res kOhm | R # k Ohm | R total k Ohm | Earth Volt Volts | Act-Earth Leakage k Ohm | RCD Current mA | Earth-Neut Current mA | Sensed Current | |
|---|---|---|---|---|---|---|---|---|---|
| 0 | 8 | 0 | 8 | 0 | 8 | 30 | 0 | 30 | Trigger |
| 1 | 8 | 0.888889 | 8.888889 | 24 | 8 | 27 | 3 | 30 | Trigger |
| 5 | 8 | 3.076923 | 11.07692 | 66.66667 | 8 | 21.666687 | 8.3333333 | 30 | Trigger |
| 10 | 8.9 | 4.708995 | 12.70899 | 88.9259 | 8 | 18.884263 | 9.9916736 | 28.9 | Probably trigger |
| 20 | 11.4 | 7.261146 | 15.25115 | 114.1903 | 8 | 15.72621 | 10.016694 | 25.8 | May not trigger |
| 50 | 13.8 | 10.81505 | 18.81505 | 137.954 | 8 | 12.755748 | 9.9966678 | 22.8 | May not trigger |
| 100 | 14.8 | 12.89199 | 20.89199 | 148.0987 | 8 | 11.487858 | 10.006871 | 22.5 | May not trigger |
| 1000 | 15.8 | 15.55424 | 23.55424 | 158.486 Higher | 8 | 10.189247 Potential Shock Current mA | 10.030761 Earth Current Limited to 10 mA | 20.2 | Probably not trigger |

TABLE 2C

Two Loops of Toroid with Earth Wire and Earth Current Limiting

| 240 V supply Earth-Neut Res kOhm | Variable Hybrid Res kOhm | R # k Ohm | R total k Ohm | Earth-Neut Volts | Act-Earth Leakage k Ohm | RCD Current mA | Earth-Neut Current mA | Sensed Current 2 turn mA | equivalent |
|---|---|---|---|---|---|---|---|---|---|
| 0 | 8 | 0 | 8 | 0 | 8 | 30 | 0 | 30 | Trigger |
| 1 | 8 | 0.888889 | 8.888889 | 24 | 8 | 27 | 3 | 33 | Trigger |
| 5 | 8 | 3.076923 | 11.07692 | 66.66667 | 8 | 21.656667 | 8.3333333 | 38.33333 | Trigger |
| 10 | 8.9 | 4.708995 | 12.70899 | 88.9259 | 8 | 18.884263 | 9.9916736 | 38.96781 | Trigger |
| 20 | 11.4 | 7.261146 | 15.26115 | 114.1903 | 8 | 15.72621 | 10.016694 | 35.7596 | Trigger |
| 50 | 13.7 | 10.75353 | 16.75353 | 137.6193 | 8 | 12.797589 | 10.045203 | 32.886 | Trigger |
| 100 | 14.8 | 12.89199 | 20.89199 | 148.0987 | 8 | 11.487658 | 10.066671 | 31.501 | Trigger |
| 1000 | 15.8 | 15.55424 | 23.55424 | 158.486 Same as 1 loop | 8 | 10.189247 Potential Shock Current mA | 10.030761 Earth Current Limited to 10 mA | 30.25077 | Trigger Increased Sensitivity |

TABLE 2D

Five Loops of Toroid with Earth Wire and Earth Current Limiting

| 240 V supply Earth-Neut Res kOhm | Variable Hybrid Res kOhm | R # k Ohm | R total k Ohm | Earth Volt Volts | Act-Earth Leakage k Ohm | RCD Current mA | Earth-Neut Current mA | | Sensed Current 5 turn mA |
|---|---|---|---|---|---|---|---|---|---|
| 0 | 8 | 0 | 8 | 0 | 8 | 36 | 0 | | 30 |
| 1 | 8 | 0.888889 | 8.888889 | 24 | 8 | 27 | 3 | | 42 |
| 5 | 8 | 3.076923 | 11.07692 | 66.66567 | 8 | 21.666657 | 8.3333333 | mA | 63.33333333 |
| 10 | 8.9 | 4.708995 | 12.70899 | 88.9259 | 8 | 18.884263 | 9.9916736 | 10 mA | 68.84263114 |
| 20 | 11.4 | 7.261146 | 15.26115 | 114.1903 | 8 | 15.72621 | 10.016694 | 10 mA | 65.8096828 |
| 50 | 13.8 | 10.81505 | 18.81505 | 137.954 | 8 | 12.755748 | 9.9966878 | 10 mA | 62.73908897 |
| 100 | 14.8 | 12.89199 | 20.89199 | 148.9987 | 8 | 11.487858 | 10.006671 | 10 mA | 61.52101401 |

TABLE 2D-continued

Five Loops of Toroid with Earth Wire and Earth Current Limiting

| 240 V supply Earth-Neut Res kOhm | Variable Hybrid Res kOhm | R # k Ohm | R total k Ohm | Earth Volt Volts | Act-Earth Leakage k Ohm | RCD Current mA | Earth-Neut Current mA | | Sensed Current 5 turn mA |
|---|---|---|---|---|---|---|---|---|---|
| 1000 | 15.8 | 15.55424 | 23.55424 | 158.486 Same as 1 & 2 Loops | 8 | 10.189247 Potential Shock Current mA | 10.030761 Earth Current Limited to 10 mA | 10 mA | 60.34305203 Greatly Increased Sensitivity |

Table 2B shows that limiting the current in the Earth to Neutral circuit of FIG. 2 to 10 mA and using a single turn for sensing winding 20, will not trigger RCD 21 at high Earth to Neutral Resistances of the electrical environment.

Tables 2C and 2D show the effects of current limiting with 2 and 5 turns respectively for winding 20. Note that the higher triggering sensitivity in Table 2D will significantly reduce a rise in Earth voltage while providing leakage sensitivity and safety at higher Earth to Neutral resistance levels.

Three Phase Power Systems

Figure 3:
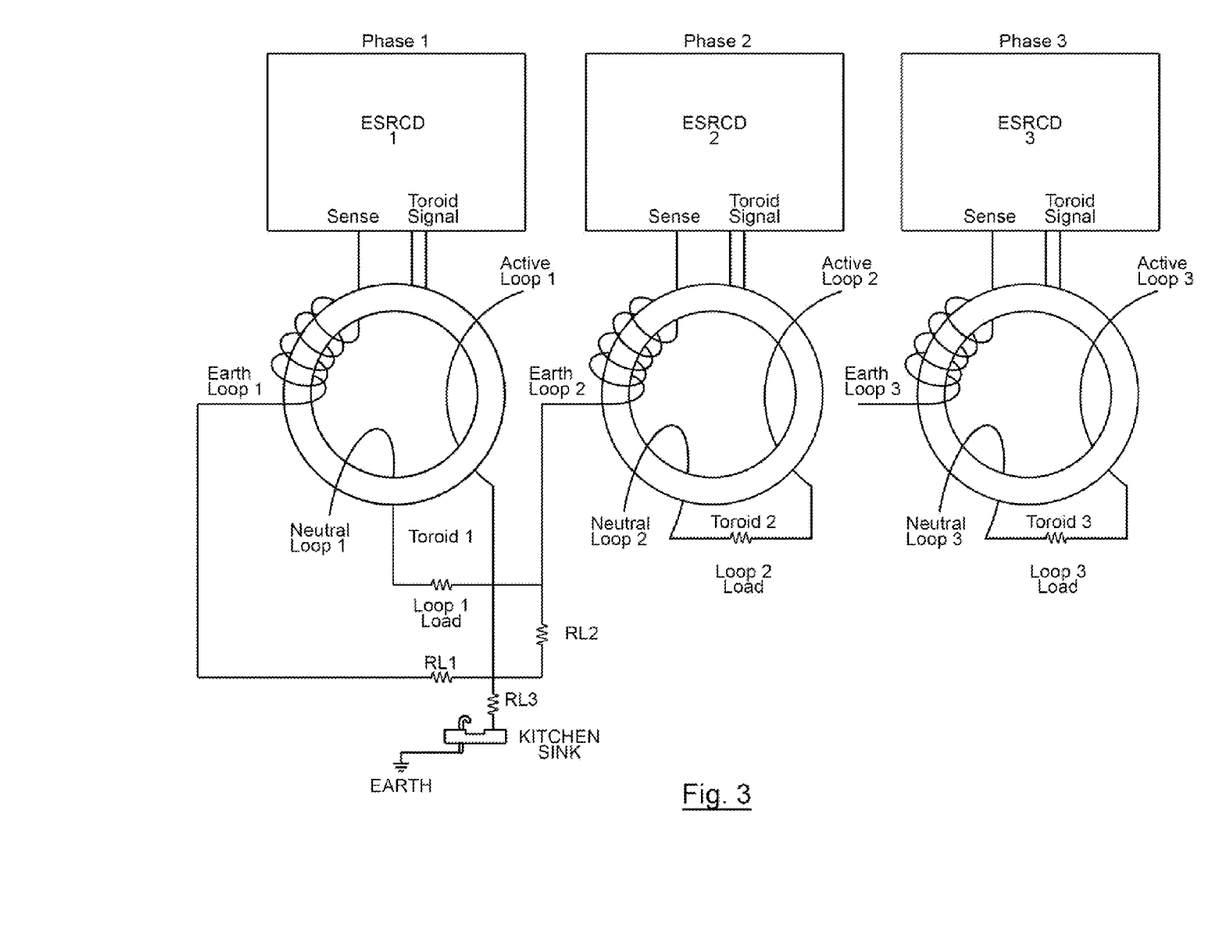
FIG. 3 shows multiple Earth current sensing RCD's connected to single phase loops of three different phases.

Many electricity supply locations include multi-phase systems for loops of single phase power. In a majority of cases while there may be an Earth loop for each Active and return Neutral loop there is also a common Earth. FIG. 3 shows multiple Earth current sensing RCDs 1-3 connected to single phase loops of three different phases. The means for sensing leakage current may include a resistor as shown in FIG. 1 and/or a current limiting circuit as shown in FIG. 2. Also shown are three types of leakage to Earth.

One type of leakage to Earth may include leakage from Phase 1 Active to an Earthed chassis of loop 1 represented via resistor RL1. In this case a rise in common Earth voltage will be detected if there is relatively poor Earth giving rise to added toroid current (having one or more loops) which should correctly trigger phase 1 supply off.

Another type of leakage to Earth may include leakage from Phase 1 Active to an Earthed chassis connected to a phase other than loop 1, represented via resistor RL2. In this example and providing that an Earth wiring fault is not present, the same Earth voltage rises as in the example above and RCD current plus Earth current sensing current should again correctly trigger off the Active conductor connected to loop 1.

A further type of leakage to Earth may include leakage from Phase 1 Active to a structure such as a kitchen sink connected in some way to an outside Earth environment (eg. via copper water pipes) represented via resistor RL3. In this case the kitchen sink Earth may have a higher resistance to Neutral than a wiring Earth to Neutral. If the wiring Earth to Neutral is low, protection may be afforded by conventional RCD operation. If the Earth to Neutral is high then leakage through the high kitchen sink resistance will add some current to the "Earth staked" chassis loop and show a reduced chassis current. For this reason multiple turns on the Earth current sensing toroid may provide sufficient additional current (in addition to same phase RCD imbalance) to correctly trigger the Active conductor connected to loop 1.

Figure 4:
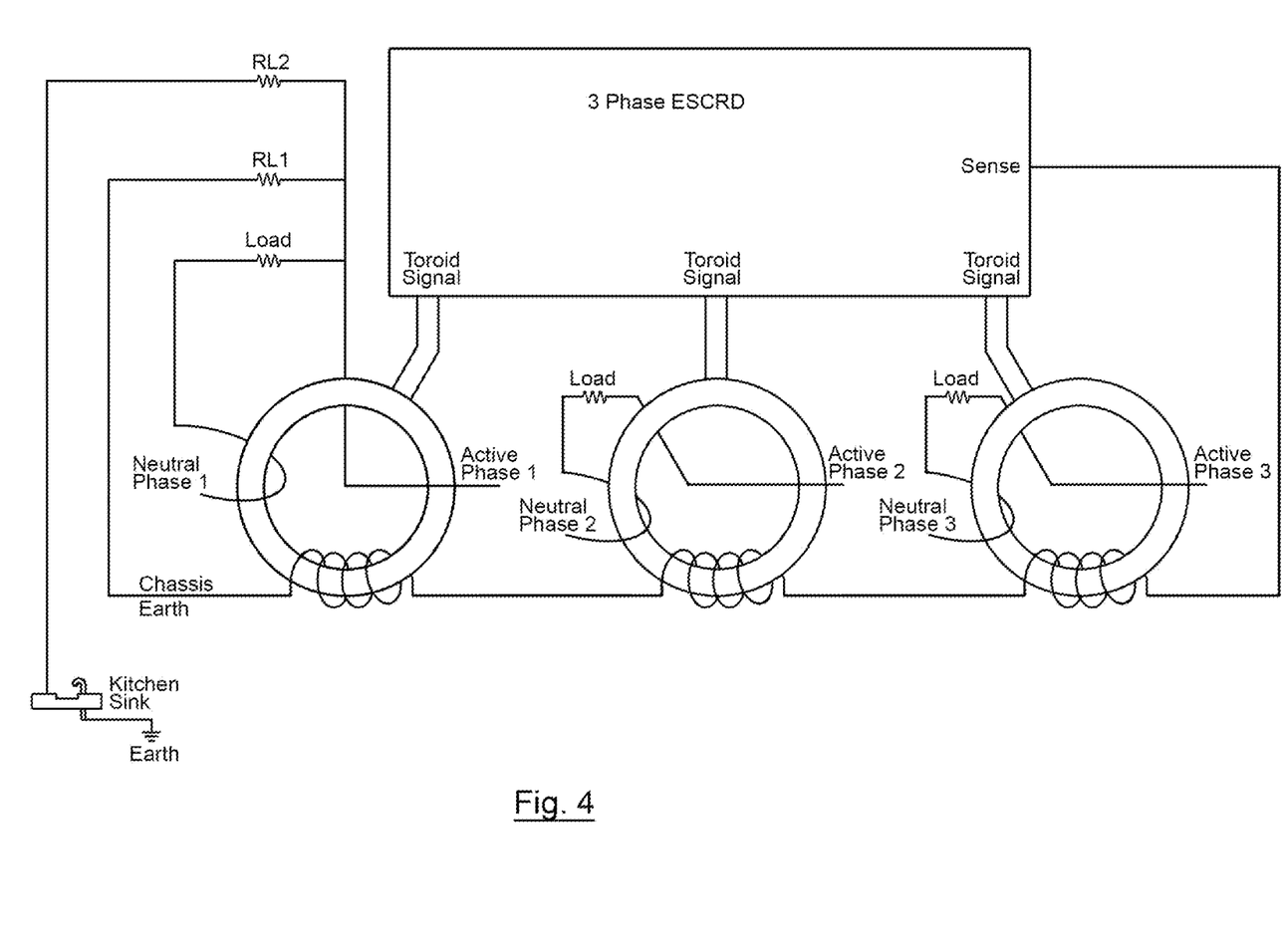
FIG. 4 shows a three-phase Earth current sensing RCD.

FIG. 4 shows a three-phase Earth current sensing RCD connected to loops of three phase machine power. Three-phase Earth current sensing RCD's with a single Earth current sensing wire to an Earthed equipment chassis operate in a similar way to single phase Earth current sensing RCD's.

Leakage is sensed from the RCD for each phase at a reduced level when the Earth to Neutral resistance is high. The Earth leakage is sensed by the same amount in each of the three phases via supply resistor RL1. Greatest triggering current should occur when load Active and Neutral return differential current is in phase with multi turn Earth current sensed by each of the three single phase toroids. Three phase power may then be correctly triggered off.

In circumstances where leakage from one of three phases goes to Earth via a "kitchen sink" and resistor RL2 or other separately grounded objects, the argument that when Earth to Neutral resistance is very high and reliance is placed on Earth current sensing technology for safety, there may be a sharing of Earth current between the sink to ground and the sink to "Earth stake" that should provide correct triggering due to multi-turn Earth current sensing and matching phases.

Common Bond Earthing Systems

There may exist an issue with Earth current sensing RCD devices in a common bond Earthing environment. When there is a rise in Earth resistance to Neutral and there are several Earth current sensing RCD's, this may give rise to a difficulty in deciding which loop Active conductor has the leakage that requires turning off.

Initially the decision may be based on a simple limit of differential current and in-phase Earth current and this may be sufficient. If this is found to be unsatisfactory, then an Earth current sensing RCD may be combined with a communications system that looks at leakages and phases and Earth to Neutral resistance across a limited area of common bond to identify faults and/or dangerous situations. Differential Active to Neutral current measurements across the range may be compared to Earth leakages across the range in both amplitude and phase to decide which RCD should be triggered. The communications system may test as well as sense dynamics of local common bond in order to trigger a correct RCD. For example, local Earth to Neutral resistance may be a variable, hence triggering limits for triggering an Earth current sensing RCD may be adjusted to allow for that variability. Use of Earth or common bond to Neutral sensing in an RCD may provide a significant opportunity to improve safety.

Figure 5:
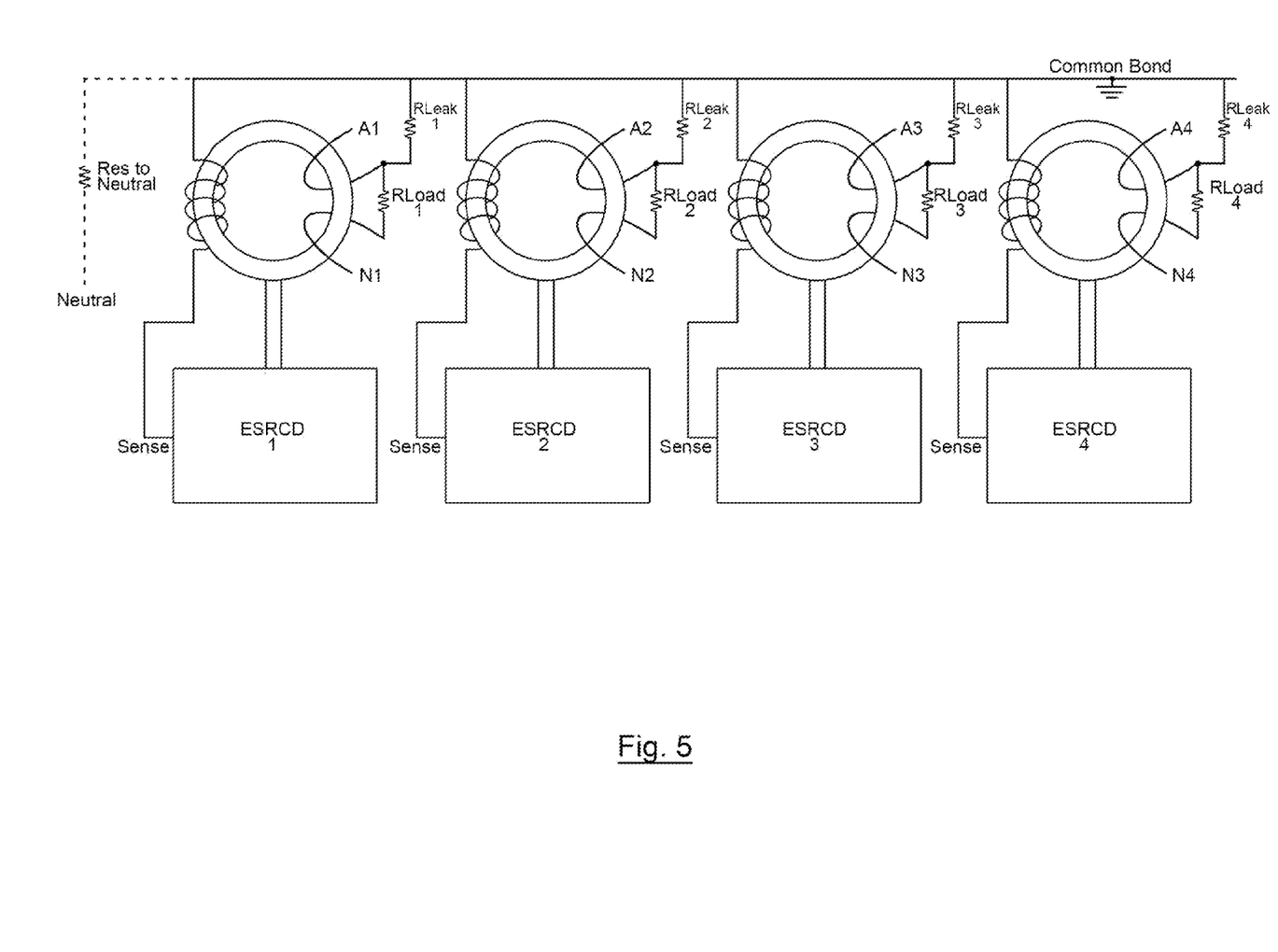
FIG. 5 shows a common bond configuration.

FIG. 5 shows a common bond supply configuration wherein four Earth current sensing RCD's 1-4 include Active and Neutral supplies from the same or separate phases. Leakage currents from each supply "loop" having an ESRCD are additional at the common bond and generate a voltage to Neutral depending upon common bond resistance to Neutral (shown dotted). Earth current leakage sensing is the same for all four ESRCD's.

Triggering the correct RCD that is causing the major leakage depends upon differential Active to Neutral current sensing of the RCD. The effect of the ESRCD is to increase sensitivity to Active-Neutral differential current by raising common Earth sensing current as conventional RCD operation is diminished. The number of Earth current sensing loops or turns may be important for optimum triggering sensitivity to differential current.

As Earth to Neutral resistance rises it may be expected that the percentage of diminished RCD effectiveness would increase due to uncertainty of resistances to Neutral of non-frame earthed items such as kitchen sinks.

Manufacturing a range of Earth sensing RCDs to suit a range of environments may be impractical when it is recognized that in many places, Earth to Neutral resistance may itself be variable depending on the weather or season. Hence a system that can monitor Earth to Neutral resistance of the frame (including a ground stake as well) and adjust Earth Sensing RCD sensitivity to suit may provide a significant advantage.

Figure 6:
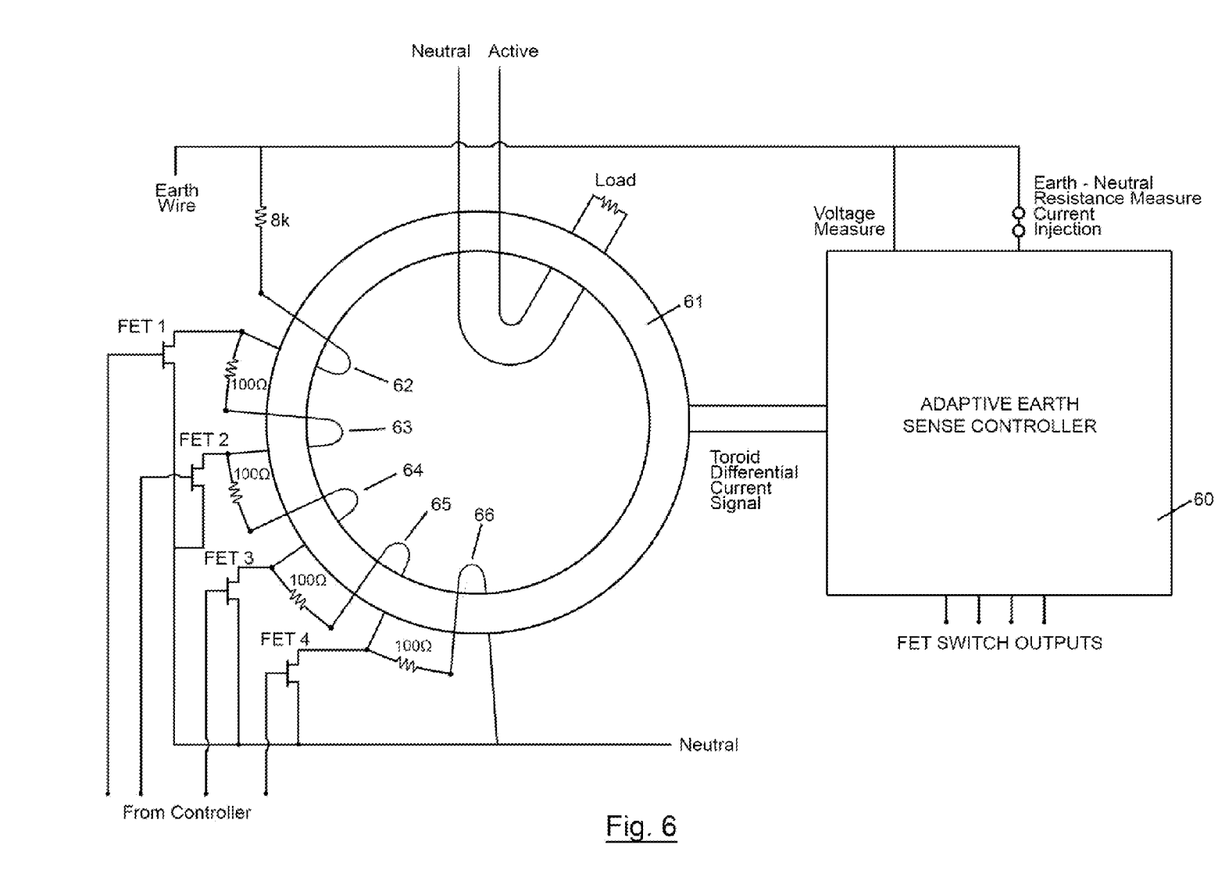
FIG. 6 shows one form of an adaptive Earth current sensing RCD.

FIG. 6 shows an Earth current sensing RCD analogous to FIG. 1, but modified to "adapt" or adjust the number of Earth current sensing loops or turns electronically depending upon local area resistance to Neutral associated with the common bond.

FIG. 6 includes an adaptive Earth sense controller 60 to monitor Earth loop resistance to neutral and to select the number of turns on the Earth sensing winding on toroid 61 which corresponds to a level of sensitivity. The desired number of turns 63-66 may be switched in with respective FETs 1-4. Turns 63-66 may include moderate size multi-strand copper that is lower in resistance around a loop than the "on" resistance of FETs 1-4. Hence 100 Ohm resistors in series with respective turns 62-64 have a minimal effect on current measurement as they are a much higher resistance than the "on" resistance of FETs 1-4 but allow FET's 1-4 to short out turns 63-66 as the "turns" include the 100 Ohm resistors (from 1 to 4). Hence controller 60 can select the total number of turns from 1 to 5.

Earth loop to Neutral resistance may be obtained by applying a low level current source (current injection) to the Earth loop to Neutral resistance while monitoring the voltage at the same time. Taking into account the 8 k resistance at the lowest sensitivity, the resistance of Earth loop to neutral may be calculated. Adaptive Earth current sensing may be implemented such that it is integrated with the safety apparatus of the present invention or is separate therefrom.

Finally, it is to be understood that various alterations, modifications and/or additions may be introduced into the constructions and arrangements of parts previously described without departing from the spirit or ambit of the invention.

The invention claimed is:

1. Safety apparatus for use with a load circuit connectable to a power supply via an Active conductor and a Neutral return conductor and including an Earth return conductor, said apparatus comprising:
    means for detecting a difference in load current flowing between an energized said Active conductor and said Neutral return conductor;
    means for disconnecting said load circuit from said power supply in response to said difference in load current;
    wherein said means for detecting includes means for sensing a leakage current flowing between said Earth return conductor and said Neutral return conductor.

2. Safety apparatus according to claim 1 wherein said means for detecting a difference in load current includes a differential current transformer, said differential current transformer having a detecting winding responsive to said difference in load current between said Active conductor and said Neutral return conductor and a sensing winding for receiving at least some of said leakage current flowing between said Earth return conductor and said Neutral return conductor.

3. Safety apparatus according to claim 2 wherein said sensing winding is arranged such that at least some of said leakage current flowing between said Earth return conductor and said Neutral return conductor acts to reinforce any said difference in said load current flowing between said Active conductor and said Neutral return conductor.

4. Safety apparatus according to claim 2 wherein said sensing winding is wound such that the phase of said leakage current is the same as said difference in load current so that their amplitudes are additive.

5. Safety apparatus according to claim 2 wherein said sensing winding is wound with plural turns to provide additional sensitivity.

6. Safety apparatus according to claim 2 including means to adjust the number of turns on said sensing winding in response to a measure of Earth to Neutral resistance.

7. Safety apparatus according to claim 1 wherein said means for detecting a difference in load current includes a toroid transformer.

8. Safety apparatus according to claim 1 wherein said apparatus includes an RCD or RCCB device.

9. Safety apparatus according to claim 1 wherein said means for sensing said leakage current includes a resistor.

10. Safety apparatus according to claim 1 wherein said means for sensing said leakage current includes a current limiting circuit.

11. Safety apparatus according to claim 1 wherein said means for disconnecting is adapted to disconnect said load circuit from said power supply without a significant difference in load current being detected.

12. Safety apparatus according to claim 1 wherein said power supply includes a three-phase power supply with a common Earth connection, each phase having an Active conductor and a Neutral return conductor, and each phase having means for detecting a difference in load current flowing between respective Active and Neutral return conductors, and including separate means for disconnecting each respective load circuit from said three-phase power supply in response to respective differences in load current; wherein the apparatus is arranged such that the phase that is disconnected is the phase with highest difference in load current and significant Earth to Neutral current in the same phase.

13. Safety apparatus according to claim 12 wherein said load circuit includes a common bond electrical environment and wherein said apparatus includes a communications system to help decide the phase that is disconnected, wherein the apparatus is arranged such that the phase that is disconnected is decided by assessing and matching highest difference in load current of one means for detecting a difference in load current with highest Earth to Neutral current in the same phase of a separate means for detecting a difference in load current.

14. A method of operating a load circuit connectable to a power supply via an Active conductor and a Neutral return conductor and including an Earth return conductor, said method comprising:
    detecting a difference in load current flowing between an energized said Active conductor and said Neutral return conductor;
    disconnecting said load circuit from said power supply in response to said difference in load current;
    wherein said step of detecting includes sensing a leakage current flowing between said Earth return conductor and said Neutral return conductor; and
    wherein the step of detecting a difference in load current is performed via a differential current transformer having a detecting winding responsive to said difference in load current between said Active conductor and said Neutral return conductor and a sensing winding for receiving at least some of said leakage current flowing between said Earth return conductor and said Neutral return conductor, wherein said sensing winding is arranged such that at least some of said leakage current flowing between said Earth return conductor and said Neutral return conductor acts to reinforce any said difference in said load current flowing between said Active conductor and said Neuteal return conductor, and wherein said sensing winding is wound such that the phase of said leakage current is the same as said difference in load current so that their amplitudes are additive.

15. A method according to claim 14 wherein said sensing winding is wound with plural turns to provide additional sensitivity.

16. A method according to claim 14 including adjusting the number of turns on said sensing winding in response to a measure of Earth to Neutral resistance.

17. A method according to claim 14 wherein the step of sensing said leakage current is performed via a resistor connected between said Neutral return conductor and said Earth return conductor.

18. A method according to claim 14 wherein the step of sensing said leakage current is performed via a current limiting circuit connected between said Neutral return conductor and said Earth return conductor.

19. A method according to claim 14 wherein the step of disconnecting is performed without a significant difference in load current being detected.

20. A method according to claim 14 wherein said power supply includes a three-phase power supply with a common Earth connection, each phase having an Active conductor and a Neutral return conductor, and including detecting a difference in load current flowing between respective Active and Neutral return conductors for each phase, and disconnecting each respective load circuit from said three-phase power supply in response to respective differences in load current, wherein the phase that is disconnected is the phase with highest difference in load current and significant Earth to Neutral current in the same phase.

21. A method according to claim 20 wherein said load circuit includes a common bond electrical environment and including obtaining data from a communications system to help decide the phase that is disconnected, wherein the phase that is disconnected is decided by assessing and matching highest difference in load current during one step of detecting a difference in load current with highest Earth to Neutral current in the same phase of a separate step of detecting a difference in load current.

* * * * *